(12) United States Patent
Gadkaree et al.

(10) Patent No.: US 8,687,346 B2
(45) Date of Patent: Apr. 1, 2014

(54) MULTI-LAYERED ELECTRODE FOR ULTRACAPACITORS

(75) Inventors: Kishor Purushottam Gadkaree, Painted Post, NY (US); James Robert Lim, Painted Post, NY (US); Kamjula Pattabhirami Reddy, Corning, NY (US)

(73) Assignee: Corning Incorporated, Corning, NY (US)

( * ) Notice: Subject to any disclaimer, the term of this patent is extended or adjusted under 35 U.S.C. 154(b) by 357 days.

(21) Appl. No.: 12/788,425

(22) Filed: May 27, 2010

(65) Prior Publication Data

US 2011/0292569 A1 Dec. 1, 2011

(51) Int. Cl.
*H01G 9/00* (2006.01)

(52) U.S. Cl.
USPC .......................................... 361/502

(58) Field of Classification Search
USPC .......................................... 361/502
See application file for complete search history.

(56) References Cited

U.S. PATENT DOCUMENTS

| | | | |
|---|---|---|---|
| 3,751,301 A | 8/1973 | Kilduff | 136/26 |
| 4,389,459 A | 6/1983 | Mirra et al. | 428/457 |
| 5,286,415 A | 2/1994 | Buckley et al. | 282/502 |
| 5,478,676 A | 12/1995 | Turi et al. | 429/234 |
| 5,849,371 A | 12/1998 | Beesley | 427/566 |
| 6,072,692 A | 6/2000 | Hiratsuka et al. | 361/502 |
| 6,134,760 A | 10/2000 | Mushiake et al. | 29/25.03 |
| 6,201,685 B1 | 3/2001 | Jerabek et al. | 361/502 |
| 6,304,426 B1 | 10/2001 | Wei et al. | 361/502 |
| 6,447,555 B1 | 9/2002 | Okamura et al. | 29/25.03 |
| 6,487,066 B1 | 11/2002 | Niiori et al. | 361/502 |
| 6,493,210 B2 | 12/2002 | Nonaka et al. | 361/502 |
| 6,565,701 B1 | 5/2003 | Jerabek et al. | 156/305 |
| 6,631,074 B2 | 10/2003 | Bendale et al. | 361/509 |
| 6,714,391 B2 | 3/2004 | Wilk et al. | 361/15 |
| 6,738,252 B2 | 5/2004 | Okamura et al. | 361/502 |
| 7,095,603 B2 | 8/2006 | Mahon et al. | 361/502 |
| 7,206,190 B2 | 4/2007 | Murakami et al. | 361/502 |
| 7,382,602 B2 | 6/2008 | Sakata et al. | 361/502 |
| 7,486,497 B2 | 2/2009 | Kobayashi et al. | 361/502 |
| 2004/0085710 A1 | 5/2004 | Takeuchi et al. | 361/502 |
| 2006/0148191 A1 | 7/2006 | Mitchell et al. | 438/396 |
| 2006/0291141 A1 | 12/2006 | Kato et al. | 361/502 |
| 2007/0025062 A1 | 2/2007 | Miyaki et al. | 361/502 |
| 2007/0238612 A1* | 10/2007 | Fujino et al. | 502/416 |
| 2008/0151472 A1* | 6/2008 | Maletin et al. | 361/502 |
| 2009/0130564 A1* | 5/2009 | Shembel | 429/232 |
| 2011/0182000 A1* | 7/2011 | Gadkaree et al. | 361/502 |
| 2011/0228447 A1* | 9/2011 | Gadkaree et al. | 361/502 |
| 2011/0261501 A1* | 10/2011 | Gadkaree et al. | 361/502 |

FOREIGN PATENT DOCUMENTS

| | | |
|---|---|---|
| EP | 1833065 A1 | 9/2007 |
| JP | 53049267 A * | 5/1978 |
| JP | 2000269095 A * | 9/2000 |
| JP | 2003104710 A * | 4/2003 |
| JP | 2006096780 A * | 4/2006 |
| WO | WO2007/116244 | 10/2007 |
| WO | 2009/139493 | 11/2009 |

* cited by examiner

*Primary Examiner* — David M Sinclair
(74) *Attorney, Agent, or Firm* — Michael W. Russell

(57) ABSTRACT

A multi-layer electrode includes a current collector having opposing first and second major surfaces, a fused carbon layer formed over one or both of the major surfaces, a conductive adhesion layer formed over each fused carbon layer, and an activated carbon layer formed over each conductive adhesive layer. The multi-layer electrode can be incorporated into a high energy density, high power density device such as an electric double layer capacitor.

16 Claims, 6 Drawing Sheets

MULTI-LAYERED ELECTRODE FOR ULTRACAPACITORS

BACKGROUND AND SUMMARY

The present disclosure relates generally to electric double layer capacitors, and more specifically to multi-layered electrode architectures having a low equivalent series resistance for incorporation into such devices.

Energy storage devices such as ultracapacitors may be used in many applications such as where a discrete power pulse is required. Example applications range from cell phones to electric or hybrid vehicles. Energy storage devices typically comprise a porous separator and/or an organic electrolyte sandwiched between a pair of carbon-based electrodes. The energy storage is achieved by separating and storing electrical charge in the electrochemical double layer at the interfaces between the electrolyte and the electrodes. Important characteristics of these devices are the energy density and power density that they can provide, which are both largely determined by the properties of the carbon-based electrodes.

Carbon-based electrodes suitable for incorporation into high energy density devices are known. The carbon materials, which form the basis of such electrodes, can be made from natural or synthetic precursor materials. Known natural precursor materials include coals, nut shells, and biomass, while synthetic precursor materials typically include phenolic resins. With both natural and synthetic precursors, carbon materials can be formed by carbonizing the precursor and then activating the resulting carbon. The activation can comprise physical (e.g., steam) or chemical activation.

In order to achieve a high energy density, the carbon materials for incorporation into carbon-based electrodes will have a high specific capacitance. Further, a low equivalent series resistance (ESR) throughout the device is desirable to increase the device's power density. In view of the foregoing, carbon-based electrodes comprising carbon material having a high specific capacitance yet displaying a low equivalent series resistance would be advantageous for incorporation into high power, high energy density ultracapacitors.

According to one embodiment, a multilayer electrode for an electric double layer capacitor comprises a current collector having opposing major surfaces, a fused carbon layer formed over one or both of the major surfaces, a conductive adhesion layer formed over each fused carbon layer, and an activated carbon layer formed over each conductive adhesion layer. The fused carbon layer and the conductive adhesion layer can be continuous or discontinuous layers. The activated carbon may be characterized by its pore size distribution, where pores having a size of ≤1 nm provide a combined pore volume of ≥0.3 $cm^3/g$, pores having a size of from >1 nm to ≤2 nm provide a combined pore volume of ≥0.05 $cm^3/g$, and the activated carbon comprises <0.15 $cm^3/g$ combined pore volume of any pores having a size of >2 nm.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and together with the description serve to explain the principles and operations of the invention.

DETAILED DESCRIPTION

Figure 1:
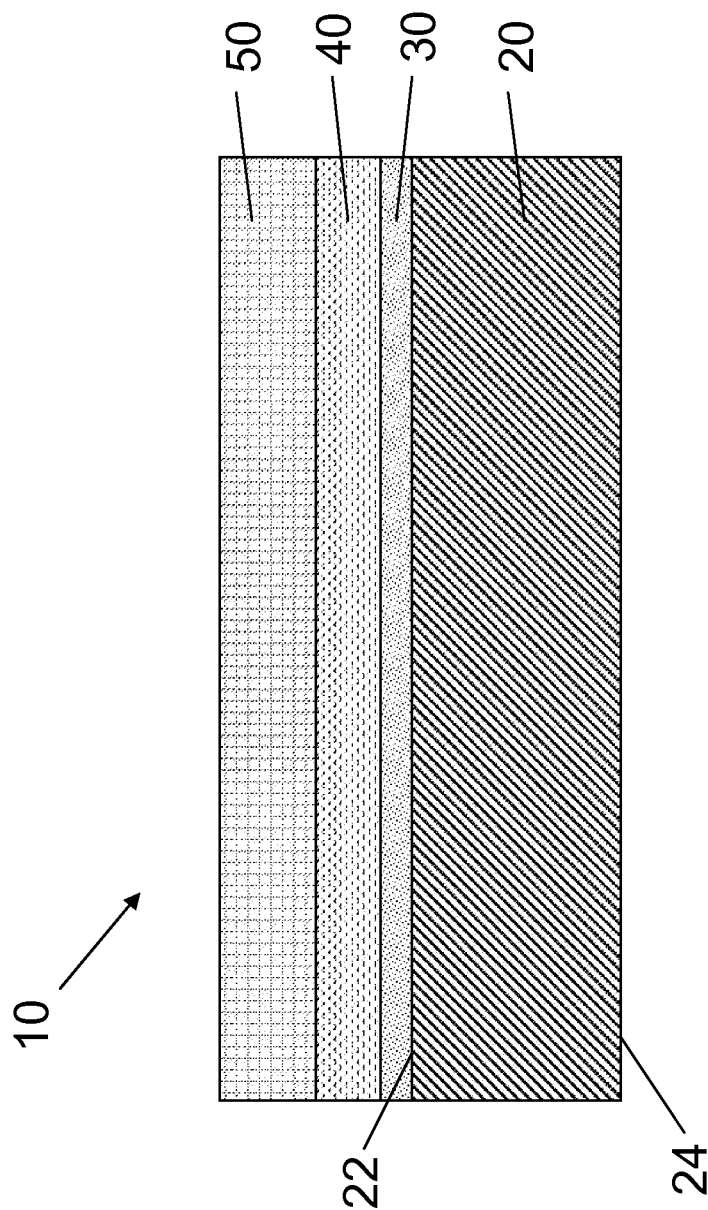
FIG. 1 is a schematic illustration of a multi-layer electrode architecture according to one embodiment.

With reference to FIG. 1, a multi-layer electrode 10, such as an electrode for an EDLC, comprises a current collector 20 having opposing first and second major surfaces 22, 24, a fused carbon layer 30 formed over one or both of the major surfaces, a conductive adhesion layer 40 formed over each fused carbon layer 30, and an activated carbon layer 50 formed over each conductive adhesive layer 40.

The current collector 20 can comprise a metal (e.g., aluminum) or a conductive metal alloy. For example, a current collector 20 can comprise capacitor grade aluminum that is formed into a sheet having a thickness of 20 to 100 microns (e.g., 25-50 microns).

A fused carbon layer 30, a conductive adhesion layer 40, and an activated carbon layer 50 are formed, respectively, over one or both of the major surfaces of the current collector 20. As used herein, when one layer is "formed over" another layer, the respective layers will be in electrical contact with each other and typically, but not necessarily, in direct physical contact with each other. For instance, in embodiments where one layer is a patterned layer or includes regions of zero thickness, a layer that is formed over the patterned layer may in some regions be in direct physical contact with the patterned layer, but may in other regions be in direct physical contact with a different layer (e.g., a layer formed previous to the patterned layer).

In embodiments, the fused carbon layer 30 is formed directly on the current collector. The fused carbon layer 30 can have an average thickness of from 0.1 to 2 microns, though the actual thickness at any given point may be less than 0.1 microns or greater than 2 microns. While the fused carbon layer 30 can be a smooth layer having a constant thickness, in embodiments the fused carbon layer 30 has a roughened surface and is characterized by a variable or discontinuous thickness. The actual thickness of the fused carbon layer 30 can range from 0 to 2 microns or greater (e.g., 0, 0.1, 0.2, 0.5, 1 or 2 microns). By actual thickness is meant the thickness at any particular location over the underlying layer. An aluminum current collector 20 comprising a fused carbon layer 30 formed over one major surface, or a pair of fused carbon layers formed over both major surfaces, can be provided by Toyo Tanso USA, Inc (Osaka, Japan).

Figure 2:
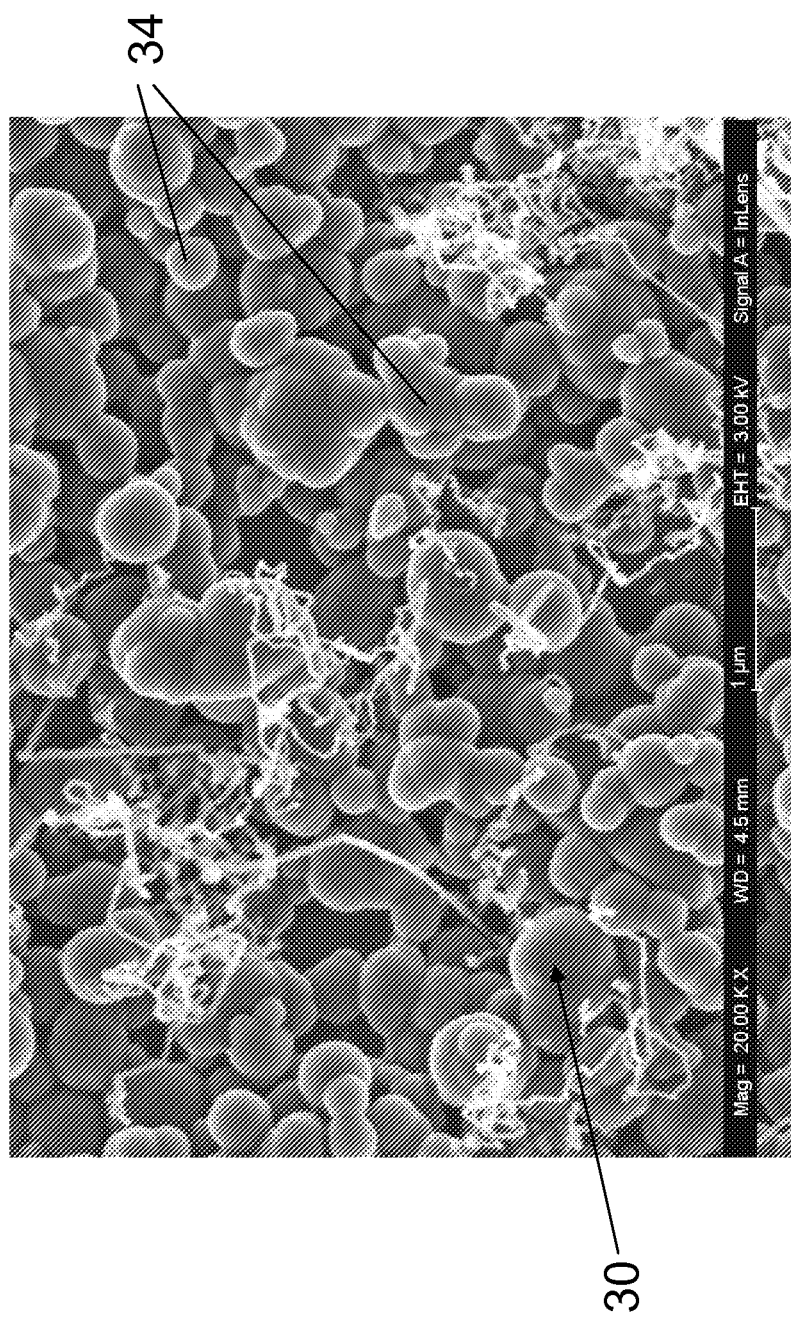
FIG. 2 is a plan view SEM micrograph of a fused carbon layer.
Figure 3:
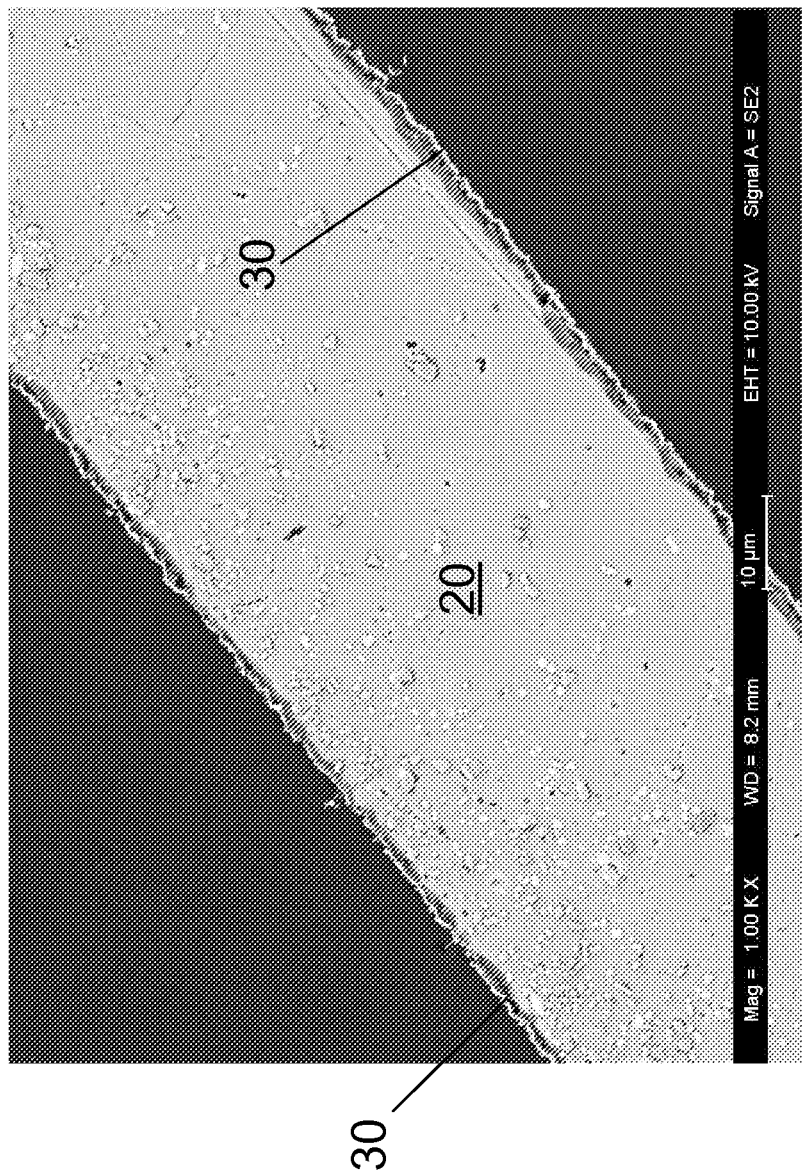
FIG. 3 is a cross-sectional SEM micrograph of a fused carbon layer formed on an aluminum current collector.

A scanning electron microscope (SEM) micrograph showing a plan view of a fused carbon layer 30 formed on an aluminum current collector is shown in FIG. 2. The fused carbon layer 30 comprises agglomerates 34 of predominately submicron-sized carbon particles. A cross-sectional SEM micrograph of opposing fused carbon layers 30 formed on both major surfaces of an aluminum current collector 20 is shown in FIG. 3.

A conductive adhesion layer is formed over the fused carbon layer. In embodiments, the conductive adhesion layer comprises a mixture of carbon black, graphite and an optional binder. The carbon black and graphite can be combined in any suitable ratio. Examples disclosed herein include a conductive adhesion layer having roughly equal parts by weight of carbon black and graphite. The conductive adhesion layer can comprise 10, 20, 30, 40, 50, 60, 70, 80 or 90±5 wt. % carbon black with the balance graphite. An average thickness of the conductive adhesion layer can range from 0.25 to 5 microns (e.g., 0.5 to 1 micron, such as about 0.75 microns). As with the fused carbon layer, an actual thickness of the conductive adhesion layer may be constant or variable. An actual thickness of the conductive adhesion layer can range from 0 to 10 microns (e.g., 0, 0.1, 0.2, 0.5, 1, 2, 5 or 10 microns). According to embodiments, the materials used to form the conductive adhesion layer can be formed into a slurry (e.g., an aqueous slurry) and deposited onto exposed surfaces of a fused carbon layer coated current collector.

Figure 4:
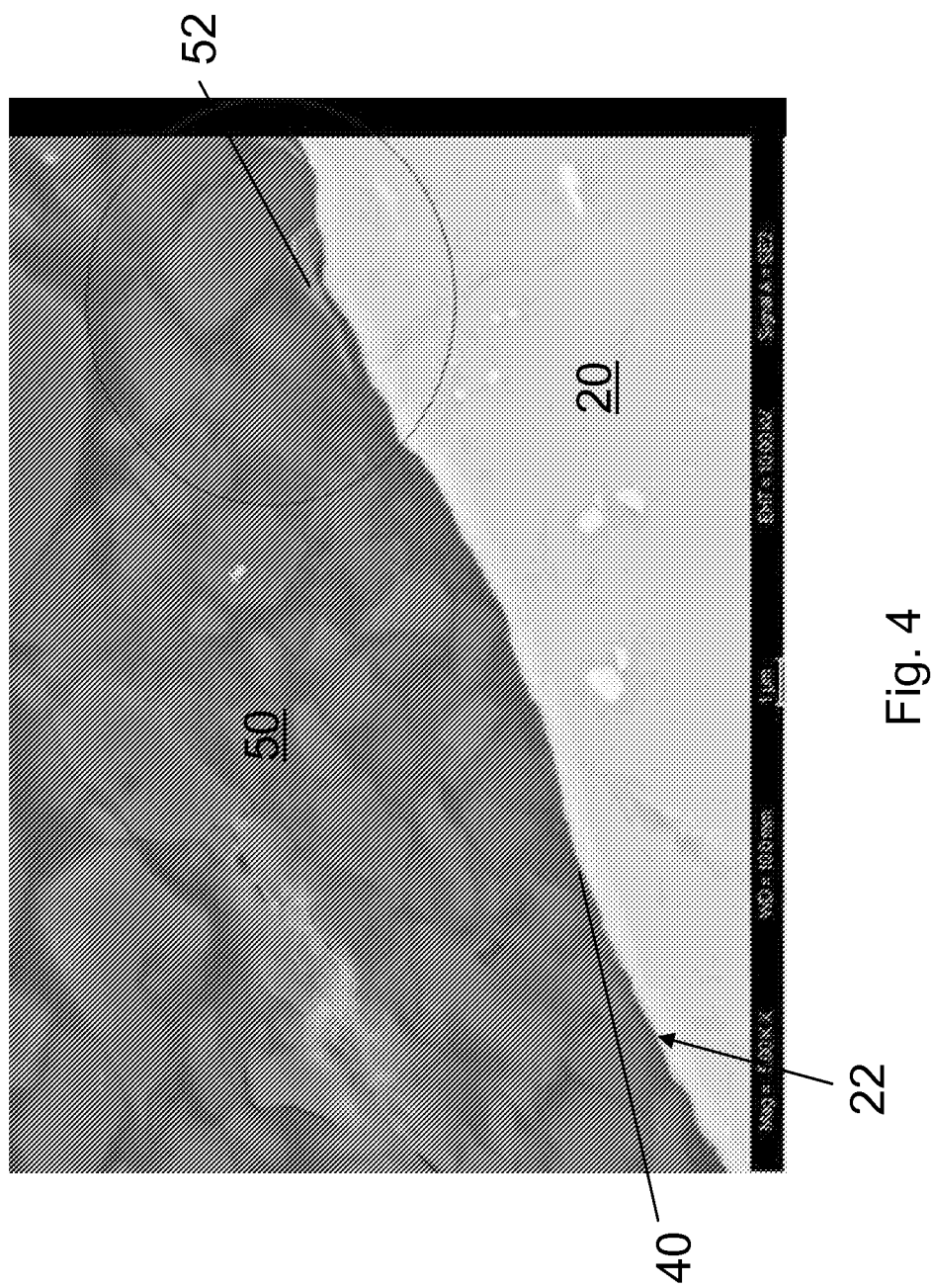
FIG. 4 is a cross-sectional SEM micrograph of a conductive adhesion layer and activated carbon layer formed over an aluminum current collector.

Shown in FIG. 4 is a cross-sectional SEM micrograph of an activated carbon layer 50 and a conductive adhesion layer 40 formed over a current collector 20. The fused carbon layer was omitted in this example for clarity. FIG. 4 shows that the conductive adhesion layer 40 has an average thickness of about 0.3 to 0.5 microns, but that an actual thickness of the conductive adhesion layer 40 may be, in certain regions, less than or greater than the average thickness. In the circled region of the figure, a carbon particle 52 directly impinges on the first major surface 22 of the current collector 20 where an actual thickness of the conductive adhesion layer is nearly zero. An interaction zone, defined as the minimum distance between the activated carbon layer and the current collector can range from 0 to about 7 microns (e.g., 0, 0.1, 0.2, 0.5, 1, 1.5, 2, 3, 4, 5, 6 or 7 microns). In embodiments, the interaction zone ranges from 0.1 to 1 micron.

Formed over the conductive adhesion layer is an activated carbon layer. The activated carbon layer may comprise microporous activated carbon. As defined herein, microscale pores have a pore size of 2 nm or less. Mesoscale pores have a pore size ranging from 2 to 50 nm. Macroscale pores have a pore size greater than 50 nm. In an embodiment, activated carbon incorporated into the multi-layer electrode (e.g., into the activated carbon layer) comprises a majority of microscale pores. As used herein, the term "microporous carbon" and variants thereof means an activated carbon having a majority (i.e., at least 50%) of microscale pores. A microporous, activated carbon material can comprise greater than 50% microporosity (e.g., greater than 50, 55, 60, 65, 70, 75, 80, 85, 90 or 95% microporosity).

The microporous carbon can have a specific surface area greater than about 300 $m^2/g$, i.e., greater than 300, 350, 400, 500 or 1000 $m^2/g$. By way of example, the microporous carbon can have a specific surface area less than 2500 $m^2/g$, i.e., less than 2500, 2000, 1500, 1200 or 1000 $m^2/g$.

In one example embodiment, the microporous carbon comprises pores having a size of up to 1 nm, which provide a combined pore volume of at least 0.3 $cm^3/g$, pores having a size of from 1 nm to 2 nm, which provide a combined pore volume of at least 0.05 $cm^3/g$, and less than 0.15 $cm^3/g$ combined pore volume of any pores having a size of greater than 2 nm.

The performance of an EDLC can be can be intimately related to the properties of the electrode and, indeed, the properties of the carbon. A challenge in developing EDLCs, including the next generation of ultracapacitors, is to increase the energy density while maintaining the power density levels. One approach to overcoming this challenge involves lowering the ESR at the interface between the current collector and the activated carbon layer.

The multi-layer electrodes disclosed herein have an improved ESR with respect to conventional electrode architectures. Advantageously, the multi-layer electrode structure promotes mechanical robustness, which, for example, promotes high temperature stability and the ability to more thoroughly dry the multi-layer electrodes prior to electrolyte filling. Drying of the electrode during or after fabrication facilitates removal of adsorbed water, which would otherwise be deleterious to device performance and long-term stability. In addition, the multi-layer architecture protects the underlying current collector (e.g., aluminum) from electrochemical corrosion or other unwanted parasitic reactions during use.

With respect to the carbon material, the total available porosity and pore size distribution can impact EDLC performance. It has been commonly thought that significant quantities of mesopores are needed for electrolyte ion access to the interior surfaces of the carbon. Applicants have demonstrated, however, that an activated carbon that is predominantly microporous with little mesoporosity exhibits superior performance and significantly higher volumetric specific capacitance (or energy density) in an EDLC than commercial carbons that have a substantial amount of mesoporosity. This advantage is attributable to the unique pore size distribution of the activated carbon materials disclosed herein.

According to embodiments, the activated carbon layer comprises activated carbon material having a total porosity greater than 0.4 $cm^3/g$ (e.g., greater than 0.4, 0.45, 0.5, 0.55, 0.6, 0.65 or 0.7 $cm^3/g$). The portion of the total pore volume resulting from micropores (d≤2 nm) can be 95% or greater (e.g., at least 95, 96, 97, 98 or 99%) and the portion of the total pore volume resulting from ultramicropores (d≤1 nm) can be 60% or greater (e.g., at least 60, 65, 70, 75, 80, 85, 90 or 95%).

The pore size distribution of the activated carbon can include ultramicropores, micropores, mesopores and macropores and may be characterized as having a unimodal, bimodal or multi-modal pore size distribution. The ultramicropores can comprise 0.3 $cm^3/g$ or more (e.g., 0.4 $cm^3/g$ or more) of the total pore volume. Pores having a pore size (d) in the range of 1<d≤2 nm can comprise 0.05 $cm^3/g$ or more (e.g., at least 0.1, 0.15, 0.2 or 0.25 $cm^3/g$) of the total pore volume. If present, any pores having a pore size greater than 2 nm, which may include mesopores and/or macropores, can comprise 0.15 $cm^3/g$ or less (e.g., less than 0.1 or 0.05 $cm^3/g$) of the total pore volume.

In various embodiments, microporous activated carbon can be formed from a lignocellulosic or non-lignocellulosic carbon (NLC) precursor. An example method for producing an activated carbon material comprises heating a natural, non-lignocellulosic carbon precursor in an inert or reducing atmosphere to form a first carbon material, mixing the first carbon material with an inorganic compound to form an aqueous mixture, heating the aqueous mixture in an inert or reducing atmosphere to incorporate the inorganic compound into the first carbon material, and removing the inorganic compound from the first carbon material to produce a microporous activated carbon material.

In the foregoing example, the natural non-lignocellulosic carbon precursor can be heated at a temperature effective to carbonize the precursor material. Example carbonization temperatures are greater than about 450° C. (e.g., at least 450, 500, 550, 600, 650, 700, 750, 800, 850 or 900° C.). The inert or reducing atmosphere used during carbonization of the carbon precursor can comprise a gas or gas mixture of one or more of hydrogen, nitrogen, ammonia, helium or argon.

After carbonization of the carbon precursor, the resulting first carbon material can be mixed with an inorganic chemical activating agent. The inorganic compound used to activate the first carbon material can include an alkali hydroxide or chloride (e.g., NaOH, KOH, NaCl, KCl), phosphoric acid, or other suitable salt such as $CaCl_2$ or $ZnCl_2$.

The first carbon material and inorganic compound can be combined in any suitable ratio. A ratio (wt. %/wt. %) of first carbon material to inorganic compound can range from about 10:1 to 1:10 (e.g., 9:1, 8:1, 7:1, 6:1, 5:1, 4:1, 3:1, 2:1, 1:1, 1:2, 1:3, 1:4, 1:5, 1:6, 1:7, 1:8 or 1:9).

Advantageously, the step of mixing can comprise mixing the first carbon material with an aqueous mixture of the inorganic compound. During the mixing, the inorganic compound can be homogeneously or substantially homogeneously mixed with the first carbon material. In one approach, the inorganic compound is initially dissolved in a solvent such as water. The solution comprising the inorganic compound is then combined with the first carbon material, and the resulting mixture can be allowed to age for an amount of time effective to permit thorough mixing of the inorganic compound with the first carbon material. By way of example, the mixture can be aged for 0.5, 1, 2, 4, 8 or more hours (e.g., from 0.5 to 8 hours).

After the inorganic compound is mixed with the first carbon material and optionally aged, the mixture is heated at a temperature effective to incorporate the inorganic compound into the first carbon material. The mixture can be heated at a temperature from about 300° C. to 1000° C. in an inert or reducing environment for a predetermined time (e.g., 0.5, 1, 2, 4, 8, or more hours) in order to activate the carbon.

Following carbonization/activation, the activated carbon product can be washed to remove both the inorganic compound and any chemical species derived from reactions involving the inorganic compound, dried, and optionally ground to produce a microporous activated carbon material.

A preferred solvent for extracting the inorganic compound is water. Optionally, the extraction solvent can include an acid. One process for removing the inorganic compound involves sequentially rinsing the activated carbon with water and acid. A further process for removing the inorganic compound involves rinsing the activated carbon with an aqueous acid mixture (e.g., mixture of acid and water). Acids used during the extraction can include hydrochloric acid. The process of extracting the inorganic compound forms a microporous, activated carbon material, the majority of the pores being defined by the volume previously filled by the inorganic compound.

The performance (energy and power density) of an ultracapacitor depends largely on the properties of the activated carbon material that is incorporated into the multi-layer electrode. The activated carbon formed according to the foregoing method can be used to form multi-layer electrodes for economically viable, high power, high energy density devices. The properties of the activated carbon material, in turn, can be gauged by evaluating the porosity and pore size distribution of the material, the oxygen content, and the electrical properties of the activated carbon material when incorporated into such an electrode. Relevant electrical properties include the area-specific resistance, and the specific capacitance.

Optionally, the oxygen content in the activated carbon can be decreased by heating the activated carbon to form a low oxygen content material. The oxygen content decreasing heat treatment step includes heating the microporous activated carbon in an inert or reducing atmosphere to a temperature effective to decrease the oxygen content.

A furnace temperature that can be used in conjunction with an inert or reducing gas to decrease the oxygen content in the activated carbon ranges from about 200° C. to 1200° C. (e.g., 200, 250, 300, 350, 400, 450, 500, 550, 600, 650, 700, 750, 800, 850, 900, 950, 1000, 1050, 1100, 1150 or 1200° C.). Suitable inert gases include nitrogen ($N_2$) and argon (Ar). In embodiments, a reducing gas can include hydrogen ($H_2$), ammonia ($NH_3$) or a gas mixture comprising hydrogen and nitrogen (i.e., forming gas). The hydrogen content in the gas mixture can be 6% or less (e.g., less than 6, 5, 4, 3, 2, or 1% $H_2$). According to an embodiment, a low oxygen content, microporous activated carbon material has an oxygen content of less than 5 wt. % (e.g., less than 5, 4.5, 4, 3.5, 3, 2.5, 2, 1.5, 1 or 0.5 wt. %).

Once formed, the microporous activated carbon can be incorporated into one or more activated carbon layers of a multi-layer electrode. In a typical electric double layer capacitor (EDLC), a pair of electrodes is separated by a porous separator and the electrode/separator/electrode stack is infiltrated with a liquid organic or inorganic electrolyte. The activated carbon layers may comprise activated carbon powder that has been mixed with other additives (e.g., binders) and compacted into a thin sheet and laminated to the current collector via the conductive adhesion layer and fused carbon layer. In addition to electric double layer capacitors, the disclosed multi-layer electrode can also be incorporated into other electrochemical electrode/device structures such as batteries or fuel cells.

By way of example, an activated carbon layer having a thickness in the range of about 50-300 micrometers can be prepared by rolling and pressing a powder mixture comprising 80-90 wt. % microporous activated carbon, 0-10 wt. % carbon black and 5-20 wt. % binder (e.g., a fluorocarbon binder such as PTFE or PVDF). Optionally, a solvent can be used to form the powder mixture into a paste that can be pressed into a sheet and dried. Activated carbon-containing sheets can be calendared, stamped or otherwise patterned and laminated to a conductive adhesion layer to form a multi-layer electrode. Prior to incorporation in the multi-layer electrode, example activated carbon-containing sheets can have a length, width and thickness of 18 inches, 3.75 inches and 250 microns, respectively. The multi-layer electrode can be incorporated into an energy storage device.

Figure 5:
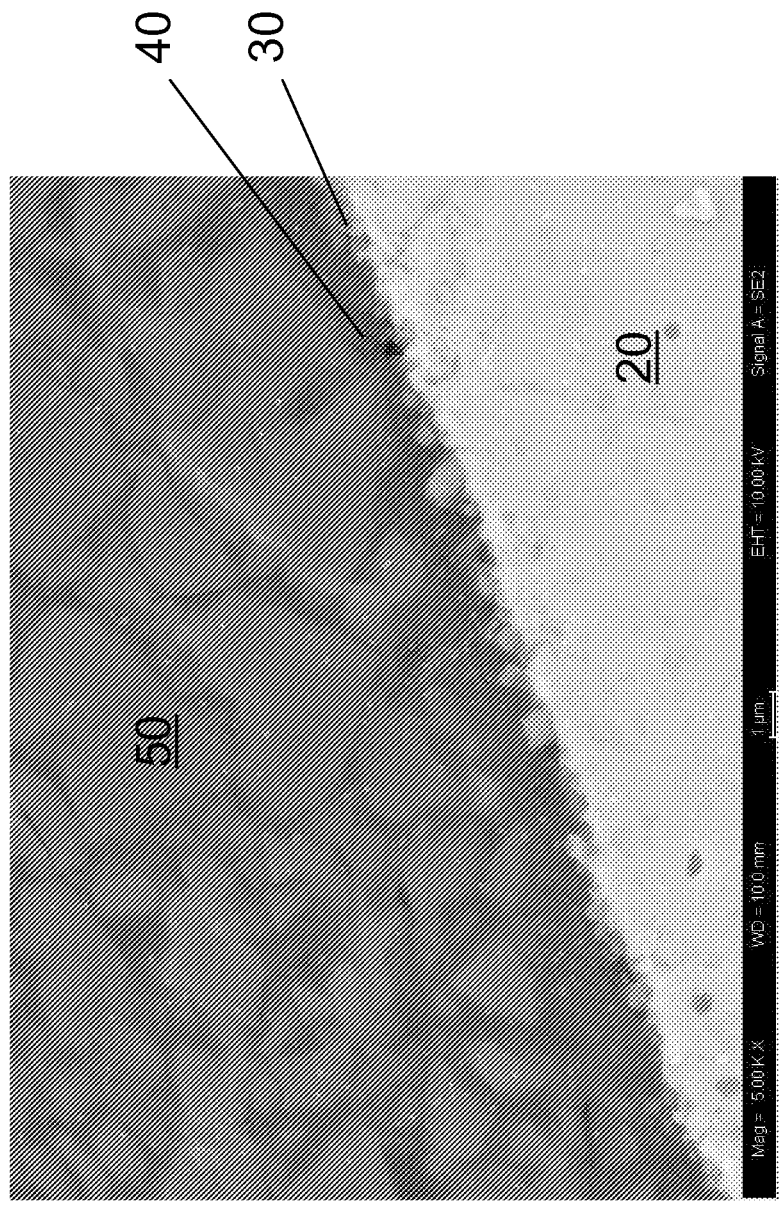
FIG. 5 is a cross-sectional SEM micrograph of a multi-layer electrode according to one embodiment.

A cross-sectional SEM micrograph of a multi-layer electrode 10 is shown in FIG. 5. The multi-layer electrode comprises a current collector 20, a fused carbon layer 30 formed over one major surface of the current collector, a conductive adhesion layer 40 formed over the fused carbon layer 30, and an activated carbon layer 50 formed over the conductive adhesive layer 40.

During use, an electric double layer can form via the stored charge that accumulates on opposing electrodes. The amount of charge stored in the electric double layer impacts the achievable energy density and power density of the capacitor. Electrical properties (e.g., volumetric capacitance and gravimetric capacitance) of microporous activated carbon materials can be evaluated by measuring the characteristics of carbon-based composite films.

The activated carbon layers evaluated herein include 85 wt. % activated carbon material, 5 wt. % conductive carbon (e.g., Black Pearls®, which is marketed by Cabot Corporation, Boston, Mass.), and 10 wt. % Teflon® (PTFE). The activated carbon layer is laminated over a conductive adhesion layer (50 wt. % graphite, 50 wt. % carbon black), which is formed over a fused carbon-coated current collector.

A button cell can be formed by punching carbon disks having a diameter of 0.625 inches from sheets of the composite material. A separator is placed between identical carbon disks which, in turn, are sandwiched between two conductive carbon-coated aluminum current collectors. A thermoset polymer ring is formed around the periphery of the assembly to seal the cell, which is filled with an organic electrolyte such as tetraethylammonium-tetrafluoroborate (TEA-TFB) in acetonitrile. A suitable concentration of electrolyte can range from 1 to 2M, e.g., 1.25, 1.5, 1.75 or 2M.

The capacitance of the cell ($C_{cell}$) is measured from galvanostatic discharge. The cell is first charged at a constant current (icharge) to a desired potential (e.g., 2.7 V), which is followed by a constant current discharge (idischarge). According to Ohm's law, capacitor current (i) is proportional to the time derivative of capacitor voltage according to:

$$i = C\frac{dV}{dt} \quad (1)$$

where C is capacitance (Farads), V is the cell voltage (Volts) and t is time (seconds).

By measuring the slope from the galvanostatic discharge curve (cell voltage vs. time), the cell capacitance can then be calculated as:

$$C_{cell} = \frac{i_{discharge}}{\frac{dV}{dt}} \quad (2)$$

The cell capacitance is the harmonic sum of two individual capacitances represented by the electrochemical double layer capacitance of each of the carbon disks (capacitors in series). This relationship can be expressed as:

$$\frac{1}{C_{cell}} = \frac{1}{C_1} + \frac{1}{C_2} \quad (3)$$

where $C_1$ and $C_2$ are the double layer capacitances of the individual carbon disks in the cell.

The magnitudes of these capacitances can be correlated to the volumetric specific capacitance of the carbon disks as:

$$C_1 = C_{sp,1} \times V_1 \quad (4)$$

$$C_2 = C_{sp,2} \times V_2 \quad (5)$$

where $C_{sp,1}$ and $C_{sp,2}$ are specific capacitances of the individual carbon disks ($F/cm^3$) and $V_1$ and $V_2$ are the corresponding electrode volumes. Because the test cell uses disks having identical size and composition, $C_1 = C_2$, $C_{sp,1} = C_{sp,2}$ ($=C_{sp}$) and $V_1 = V_2$ ($=V_{total}/2$, where $V_{total}$ is the total volume ($cm^3$) of carbon in the cell). Equations (3), (4) and (5) can be combined to give a volumetric capacitance, $C_{sp}$ as:

$$\frac{1}{C_{cell}} = \frac{2}{C_{sp} \times V_{total}} + \frac{2}{C_{sp} \times V_{total}} \quad (6)$$

or, $$C_{sp} = \frac{4 \times C_{cell}}{V_{total}} \quad (7)$$

The energy storage device can include an ultracapacitor. Ultracapacitors can have a jelly roll design, prismatic design, honeycomb design, or other suitable configuration. A microporous carbon-containing multi-layer electrode can be incorporated into a carbon-carbon ultracapacitor or into a hybrid ultracapacitor. In a carbon-carbon ultracapacitor, both the positive electrode and the negative electrode comprise activated carbon. In a hybrid ultracapacitor, one of the electrodes is carbon-based, and the other electrode can be a pseudo capacitive material such as lead oxide, ruthenium oxide, nickel hydroxide, or another material such as a conductive polymer (e.g., parafluorophenyl-thiophene).

Microporous activated carbon produced using a non-lignocellulosic precursor offers significantly higher energy storage capacity in EDLCs compared to major commercial carbons. For example, when the microporous activated carbon according to the present disclosure is incorporated into the activated carbon layer of a multi-layer electrode, the volumetric specific capacitance is greater than 70 $F/cm^3$ (e.g., greater than 70, 75, 80, 85, 90, 92, 94, 96, 98 or 100 $F/cm^3$).

The equivalent series resistance of the disclosed multi-layer electrodes can be inferred using a through-plane area-specific resistance measurement. Without wishing to be bound by theory, the fused carbon layer can form intimate contact with the current collector, which lowers the electrical contact resistance at the interface. The fused carbon layer, however, does not adhere well with the activated carbon layer. Indeed, the fused carbon layer-activated carbon layer interface of various test samples exhibited a mechanically weak high resistance gap. By forming a conductive adhesion layer at the interface between the fused carbon layer and the activated carbon layer, a mechanically stable multi-layer electrode exhibiting low interfacial contact resistance can be formed.

Figure 6:
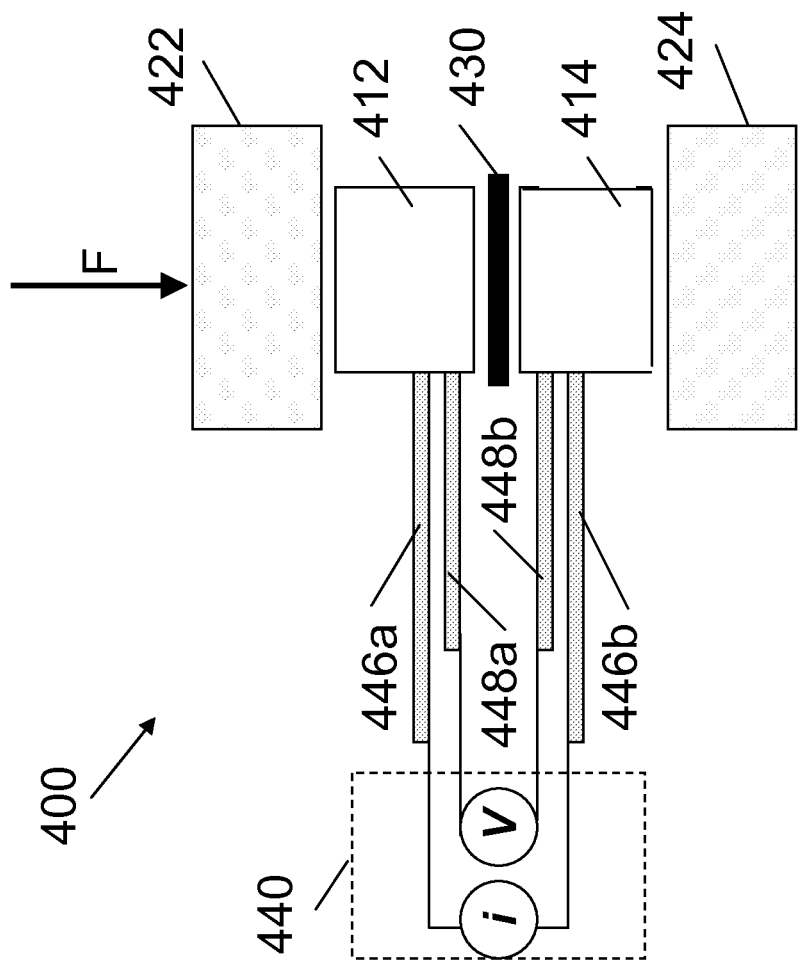
FIG. 6 is a schematic illustration of a test apparatus for evaluating equivalent series resistance.

The through-plane electrical resistance of free-standing carbon electrodes can be measured using the testing apparatus 400 shown schematically in FIG. 6. The testing apparatus 400 includes two ceramic disks 412, 414 each having a 1 inch diameter and covered with a 0.5 mil thick silver foil. The ceramic disks 412, 414 are mounted on an Instron® Electromechanical Test System (Model 4202) having upper and lower platens 422, 424. By applying a force F to the upper platen 422, a pre-determined load can be applied to a sample 430 via the ceramic disks 412, 414.

The diameter of each multi-layer electrode 430 to be tested measured and the sample is centered between the ceramic disks 412, 414. The silver foils are connected to a digital multimeter (Model 2700, Keithley Instruments) 440 in a standard four-wire configuration. A load of 100 lbs is applied to the multi-layer electrode and the multimeter 440 applies a current (i) of known magnitude to the outer two leads 446a and 446b and measures the resulting voltage (V) between the inner two leads 448a and 448b.

The measured voltage is converted to resistance. A background resistance, which corresponds to the resistance between the silver foils without any sample, is subtracted from the measured resistance. The multimeter can measure resistances with a resolution of 1 μΩ. Reported values represent the average of measurements from at least three different samples of the same multi-layer electrode.

The measured resistance of each multi-layer electrode (R, in Ω) can be correlated to the resistivity of the electrode materials (ρ, in Ω-cm), thickness of the electrode (l, in cm) and the geometric area of the electrode in contact with the silver foil (A, in cm$^2$) according to the known relationship:

$$R = \rho \frac{l}{A} \quad (1)$$

The area-specific resistance ($R_{sp}$, in Ω-cm$^2$) of the electrode is then given by:

$$R_{sp} = R \times A \quad (2)$$

For the area-specific resistance measurement, samples are tested both as-formed and again after oven exposure to 150° C. for 16 hours.

EXAMPLES

The invention will be further clarified by the following examples.

Example 1

Comparative

A commercially available current collector (Exopack, Matthews, N.C.) is laminated at room temperature on both sides with a reference activated carbon layer. The thickness of the activated carbon layer is about 250 microns. The reference activated carbon layer used in this as well as in the following examples comprises a commercially-available activated carbon material (Kuraray Carbon Inc., Osaka, Japan) that is combined with carbon black and a binder in a ratio of 85 wt. % activated carbon, 5 wt. % carbon black, and 10 wt. % Teflon® (PTFE).

The measured through-plane area-specific resistance is 0.25 ohm-cm$^2$ (as manufactured) and 0.90 ohm-cm$^2$ after exposure to 150° C. for 16 hours.

Example 2

Comparative

An aqueous slurry of a conductive ink comprising approximately equal parts by weight of carbon black and graphite is dip-coated onto both sides of an aluminum 1145 H19 foil. The average thickness of each conductive adhesion layer is about 1 to 3 microns. A reference activated carbon layer is laminated at a lamination temperature of 200° C. and a lamination pressure of 250 pli over the conductive adhesion layers. The activated carbon layer has a thickness of about 250 microns. As formed, the through-plane area-specific resistance of the resulting electrode is 0.04 ohm-cm$^2$. After exposure to 150° C. for 16 hours, the through-plane area-specific resistance is 0.05 ohm-cm$^2$.

Examples 3-5

Comparative

The experiment of example 2 was repeated using pre-etched aluminum current collector substrates marketed by KDK Corporation, Tokyo, Japan. The substrates were designated by their respective etch protocol, G571, C208 or C209. The aluminum corresponding to G571 was about 75 microns thick, while the aluminum for C208 and C209 was about 50 microns thick. After lamination of the reference activated carbon layer, the through-plane area-specific resistance varies over the range of 0.05-0.06 ohm-cm$^2$ for both as-formed and stress tested electrodes.

Example 6

The experiment of example 2 was repeated using a 50 micron thick fused-carbon coated aluminum sheet (Toyo Tanso, Osaka, Japan) in lieu of a conventional current collector. The average thickness of the fused-carbon coated is less than 1 micron. The through-plane area-specific resistance is 0.03 ohm-cm$^2$ both prior to and following the 150° C., 16 hour stress test. Incorporation of the fused-carbon coated current collector into the multi-layer electrode architecture substantially reduces the interfacial resistance at the interface between the aluminum and the activated carbon. In embodiments, the thru-plane area-specific resistance of double-sided multi-layer electrodes is less than 0.1 ohm-cm$^2$.

Examples A and B

Comparative

Ultracapacitor test cells were fabricated using NLC activated carbon in the activated carbon layer (85 wt. % NLC activated carbon, 5 wt. % carbon black, 10 wt. % PTFE binder). The activated carbon layer was laminated over the dip-coated current collector of example 2. The RC time constant of the resulting cell was between 1.3 and 1.5 seconds and demonstrated a capacitance of nearly 500F.

Example C

Based on the thru-plane area-specific resistance data of examples 1-6 and the experimental test cell data of examples A and B, a test cell comprising a multi-layer electrode as disclosed herein was modeled and corresponding test cell statistics were calculated. The resulting RC time constant for a test cell comprising a multi-layer electrode and including NLC carbon in the activated carbon layer is estimated to be about 1 second, which is a surprising and advantageous result, and which suggests that the modeled architecture will enable devices having both high energy density and high power density.

The through-plane area-specific resistance data for examples 1-6 is summarized in Table 1. The data summarize both pre- and post-stress test $R_{sp}$ values. The error for each measurement is ±0.01 ohm-cm$^2$, except for the post-stress test result for the Exopack electrode, which is 0.90±0.15 ohm-cm$^2$.

TABLE 1

Through-plane area-specific resistance data

| Sample | $R_{sp}$ (ohm-cm$^2$) (as-prepared) | $R_{sp}$ (ohm-cm$^2$) (after 16 hr, 150° C. exposure) |
| --- | --- | --- |
| 1 Exopack Electrode (comparative) | 0.25 | 0.90 |
| 2 1145 H19 foil (comparative) | 0.04 | 0.05 |
| 3 G571 (comparative) | 0.06 | 0.05 |
| 4 C208 (comparative) | 0.05 | 0.06 |
| 5 C209 (comparative) | 0.05 | 0.05 |
| 6 Multi-layered electrode | 0.03 | 0.03 |

The electrical data for the ultracapacitor test cells evaluated and modeled in Examples A-C is summarized in Table 2.

TABLE 2

Ultracapacitor test cell area-specific resistance data

| | $R_{sp}$ (ohm-cm$^2$) (16 hr, 150° C.) | Cell ESR (ohm-cm$^2$) | Cell matched electrode area (cm2) | Cell ESR (milli-ohms) | Cell capacity (Farads) | RC-time constant (sec) |
|---|---|---|---|---|---|---|
| A | 0.05 | 2.97 | 1150 | 2.58 | 496.0 | 1.28 |
| B | 0.06 | 3.40 | 1112 | 3.06 | 486.2 | 1.49 |
| C | 0.03 | 2.26 | 1131 | 2.00 | 500.0 | 1.00 |

The multiple layers that comprise the multi-layer electrode disclosed herein promote mechanical robustness and both decrease and stabilize the interfacial resistance of the resulting electrode structure as compared with conventional electrodes. The associated methods of forming a multi-layer electrode decrease the dependency incurred by conventional methods on cleaning, etching or additional process of the current collector.

As used herein, the singular forms "a," "an" and "the" include plural referents unless the context clearly dictates otherwise. Thus, for example, reference to a "layer" includes examples having two or more such "layers" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It is also noted that recitations herein refer to a component of the present invention being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

It will be apparent to those skilled in the art that various modifications and variations can be made to the present invention without departing from the spirit and scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A multilayer electrode for an electric double layer capacitor, comprising:
   a current collector having opposing major surfaces;
   a continuous layer of fused carbon formed over substantially all of one or both of the major surfaces;
   a continuous conductive adhesion layer comprising carbon black, graphite and a binder formed over each fused carbon layer; and
   an activated carbon layer formed over each conductive adhesion layer.

2. The multilayer electrode according to claim 1, wherein the fused carbon layer is formed over both of the major surfaces of the current collector.

3. The multilayer electrode according to claim 2, having a thru-plane area-specific resistance of less than 0.1 ohm-cm$^2$.

4. The multilayer electrode according to claim 1, wherein the fused carbon layer has an average thickness of about 0.1 to 2 micrometers and the conductive adhesion layer has an average thickness of about 0.25 to 5 micrometers.

5. The multilayer electrode according to claim 1, wherein the conductive adhesion layer comprises about 40-60 wt. % of carbon black particles having an average particle size of between about 0.1 and 1 micrometers, and about 40-60 wt. % of graphite particles having an average particle size of between about 5 and 50 micrometers.

6. The multilayer electrode according to claim 1, wherein the activated carbon layer comprises microporous activated carbon.

7. The multilayer electrode according to claim 1, wherein the activated carbon layer comprises activated carbon, carbon black and a binder.

8. The multilayer electrode according to claim 1, wherein the activated carbon layer comprises 80-90 wt. % activated carbon, 0-10 wt. % carbon black and about 5-15 wt. % PTFE.

9. The multilayer electrode according to claim 1, wherein activated carbon in the activated carbon layer comprises:
   pores having a size of ≤1 nm, which provide a combined pore volume of ≥0.3 cm$^3$/g;
   pores having a size of from >1 nm to ≤2 nm, which provide a combined pore volume of ≥0.05 cm$^3$/g; and
   <0.15 cm$^3$/g combined pore volume of any pores having a size of >2 nm.

10. The multilayer electrode according to claim 1, wherein an interaction zone between the current collector and the activated carbon layer ranges from about 0.1 to 1 microns.

11. An electric double layer capacitor comprising the multilayer electrode according to claim 1.

12. A device comprising the electric double layer capacitor according to claim 11.

13. A method of forming a multilayer electrode for an electric double layer capacitor, said method comprising the acts of:
   providing a current collector having opposing major surfaces;
   forming a continuous layer of fused carbon over substantially all of one or both of the major surfaces;
   forming a continuous conductive adhesion layer over each fused carbon layer to form a pre-electrode assembly; and
   forming an activated carbon layer over each conductive adhesion layer.

14. The method according to claim 13, wherein forming the conductive adhesion layer comprises a method selected from the group consisting of dip-coating, gravure coating, tape casting, curtain coating, slot die coating, meniscus coating and spray coating.

15. The method according to claim 13, further comprising heating the pre-electrode assembly at a temperature effective to remove adsorbed water and/or residual organics prior to forming the activated carbon layer.

16. The method according to claim 13, wherein the activated carbon layer is laminated over each conductive adhesion layer.

\* \* \* \* \*